A. TSCHUDI.
PROCESS AND APPARATUS FOR THE MANUFACTURE OF HYDROBROMIC ACID FROM BROMIN AND HYDROGEN.
APPLICATION FILED DEC. 22, 1919.
1,380,084. Patented May 31, 1921.
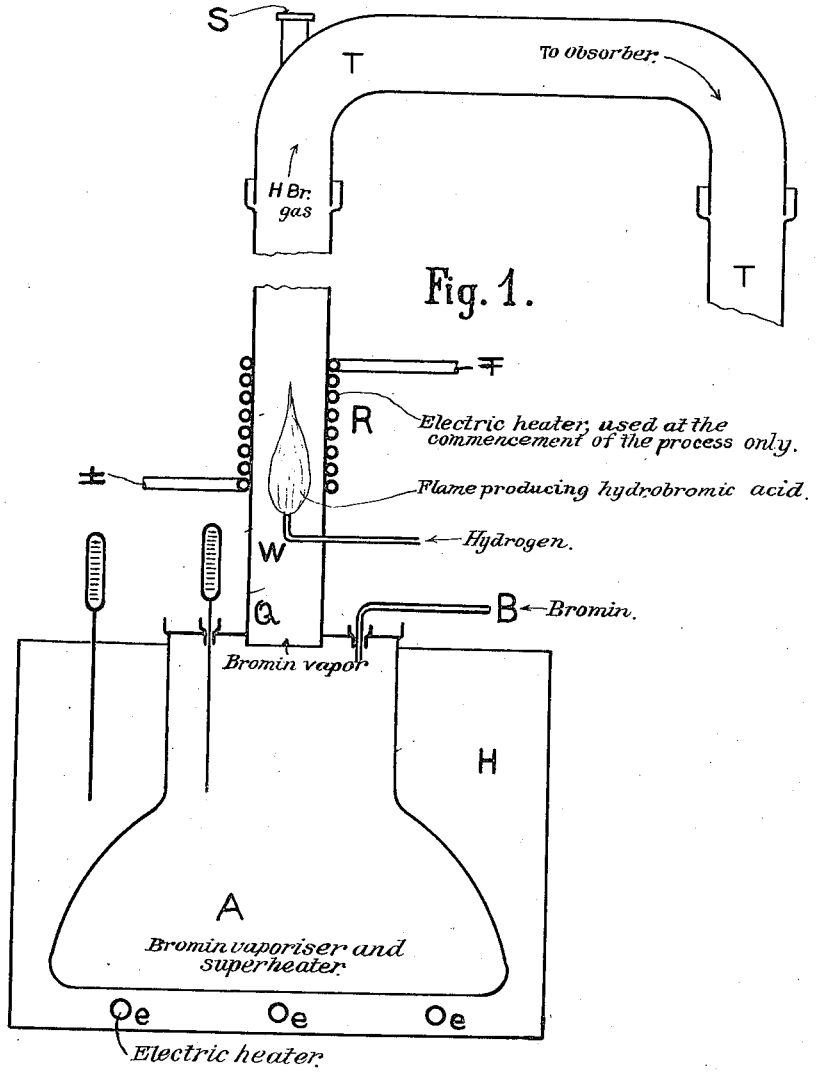
Witnesses:
Inventor.

UNITED STATES PATENT OFFICE.

AEGIDIUS TSCHUDI, OF RIEHEN, NEAR BASEL, SWITZERLAND.

PROCESS AND APPARATUS FOR THE MANUFACTURE OF HYDROBROMIC ACID FROM BROMIN AND HYDROGEN.

1,380,084.   Specification of Letters Patent.   Patented May 31, 1921.

Application filed December 22, 1919. Serial No. 346,757.

*To all whom it may concern:*

Be it known that I, AEGIDIUS TSCHUDI, a citizen of Switzerland, and a resident of Riehen, near Basel, Switzerland, have invented certain new and useful Improvements in Processes and Apparatus for the Manufacture of Hydrobromic Acid from Bromin and Hydrogen, of which the following is a specification.

Technical processes for the production of synthetic hydrobromic acid by combination of bromin and hydrogen have hitherto been unknown. The procedures for the manufacture of hydrobromic acid found in literature and destined for use in laboratories differ from the process hereinafter described inasmuch as they mostly employ catalyzers (Ostwald, *Anorganische Chemie,* Harding, *Berichte der Deutschen Chemischen Gesellschaft*, vol. 14, 1881, page 2085, Lassar-Cohn, *Arbeitsmethoden,* edition 1907, page 375). These laboratory researches are technically of no further importance. The use of catalyzers, such as charcoal, pumice-stone, etc., impedes the free development of the flame and very often yields products containing free bromin as an impurity. Without catalyzers as for instance according to the process described in the "*Berichte der Deutschen Chemischen Gesellschaft*", vol. 22, 1889, page 867, the flame burns irregularly and is easily extinguished, because the hydrobromic acid produced is not removed quickly enough, or an explosive combustion takes place, extending even into the bromin evaporator.

According to the present invention hydrobromic acid is produced from about molecular quantities of hydrogen and bromin in the following manner: Bromin vapor and hydrogen are burned up (*i. e.* caused to combine with the production of a flame) in a tube-like receptacle placed in a vertical position, into which the bromin vapor is introduced lower down than the hydrogen current; the bromin vapor burns up quantitatively at the place at which the hydrogen enters. In this manner a steadily burning flame is obtained and the hydrobromic acid, which hinders the combustion, is removed by means of a natural draft. In this manner the striking back of the flame may be prevented, a fact by which the process of this invention is much better than the processes according to which the two gases are first mixed and then burned in any part of the receptacle. The hydrogen, being light, rises and does not get into that part of the receptacle in which the bromin vapor is being developed.

One example of the invention is illustrated in the attached drawing.

Into the quartz receptacle A bromin is introduced through the tube B and evaporated and the vapor superheated by means of the heat produced in the oven H by electric heating elements *e—e—e*. In this state the bromin rises into the quartz tube Q and at W comes into contact with the hydrogen streaming in. With the aid of the electric heating spiral R the tube is heated to the necessary reaction temperature, whereby the ignition is effected. The heating of the tube may then be stopped, as the heat produced by the combustion is sufficient for keeping the tube at reaction temperature. The flame may be left to burn and does not need any attention from the operator, when once the quantities of hydrogen and bromin vapor have been regulated, a fact which is recognizable by the color of the flame, which is watched through a sight glass S, or through the transparent quartz tube Q. The theoretical quantity of hydrogen may be sufficient, but it is nevertheless advisable to add a small excess. The hydrobromic acid gas is driven off by the draft, which is favored by the temperature of the flame, and is thence conducted through the tube T into an absorption apparatus, such as one of the well known Turill systems.

I claim:

1. A process of making hydrobromic acid from bromin and hydrogen, which comprises causing bromin vapor to occupy the lower portion of an upwardly-extending, tube-like receptacle, and to flow upwardly therein toward a current of hydrogen gas introduced into said receptacle, and burning the bromin vapor by means of the hydrogen at the place at which the hydrogen enters the receptacle, substantially as and for the purpose described.

2. A process of making hydrobromic acid from bromin and hydrogen, which comprises causing bromin vapor to occupy the lower portion of an upwardly-extending, tube-like receptacle, and to flow upwardly therein toward a current of hydrogen gas introduced into said receptacle, burning the bromin vapor by means of the hydrogen at the place at which the hydrogen enters the receptacle, the respective quantities of bromin and hydrogen being so regulated that, after combustion is initiated, it is able to continue itself, and maintaining the supply of bromin vapor and hydrogen, substantially as and for the purpose described.

3. A device for producing hydrobromic acid comprising a bromin evaporator and a superposed upwardly extending tube placed above said evaporator, a hydrogen inlet to said tube, and a heating element located in proximity to the junction of said hydrogen inlet and upwardly extending tube.

4. A device for the production of hydrobromic acid comprising a heating vessel made of quartz, a reaction tube extending upwardly from said heating vessel serving as an outlet therefor, also made of quartz, a hydrogen inlet tube entering said reaction tube at a point intermediate its two ends and a heating element surrounding said reaction tube at a point near the hydrogen inlet.

5. A process of making hydrobromic acid from bromin and hydrogen, which comprises introducing bromin vapor into the lower part of an upwardly-extending, tube-like receptacle, and causing it to flow upwardly therein toward a current of hydrogen gas introduced into said receptacle, initiating combustion of the bromin vapor by the hydrogen at the place at which the hydrogen enters the receptacle, by heating the receptacle to combustion temperature near the place at which the hydrogen enters, and causing said combustion to maintain itself by regulating the respective supplies of bromin vapor and hydrogen, substantially as and for the purpose described.

In witness whereof I have hereunto set my hand.

AEGIDIUS TSCHUDI.

Witnesses:
  HEINRICH KUBLI,
  HERBERT RAUCH.